United States Patent Office 3,462,410
Patented Aug. 19, 1969

3,462,410
SULPHONAPHTHALENE - AZO - 1 - ARYL - 5 - PYRAZOLONE DYESTUFFS CONTAINING A DI- OR TRIHALOPYRIMIDYL OR A MONO OR DI- HALOTRIAZINYL RADICAL
Lukas Schneider, Basel, Switzerland, assignor to Sandoz Ltd. (also known as Sandoz A.G.), Basel, Switzerland
No Drawing. Continuation-in-part of application Ser. No. 295,186, July 15, 1963. This application July 21, 1967, Ser. No. 654,974
Claims priority, application Switzerland, Jan. 29, 1960, 984/60; Mar. 30, 1960, 3,580/60
Int. Cl. C09b *62/08;* C07c *143/56;* C07d *57/00*
U.S. Cl. 260—153
8 Claims

ABSTRACT OF THE DISCLOSURE

Monoazo dyestuffs of the formula

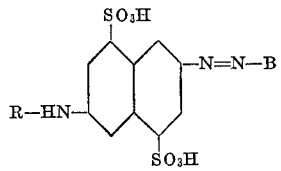

(I)

wherein:

B represents the radical of a hydroxynaphthalene or 1-aryl-5-pyrazolone which is coupled in a position vicinal to the hydroxy group, bears at least one sulfonic acid group and may contain other substituents, and R is a di- or trihalogenopyrimidyl or a mono- or dihalogenotriazinyl radical which dyestuffs are suitable for dyeing vegetable fibers, regenerated cellulose, animal fibers and synthetic polyamide fibers with excellent fastness properties.

---

The present application discloses subject matter disclosed in my copending application Ser. No. 295,168, filed July 15, 1963, which application is in turn a continuation-in-part of application Ser. No. 82,685, filed Jan. 16, 1961, now abandoned. This application relates to new monoazo dyestuffs of the formula

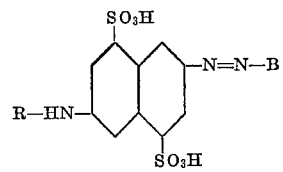

(I)

wherein:

B represents the radical of a hydroxynaphthalene or 1-aryl-5-pyrazolone which is coupled in a position vicinal to the hydroxy group, bears at least one sulfonic acid group and may contain other substituents, and R—HN— represents a group of the formula

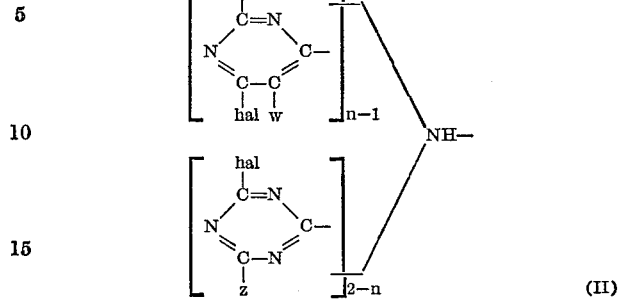

(II)

hal being chlorine or bromine, w being hydrogen, chlorine, bromine, methyl, ethyl, carboxy or carboxymethyl, z being chlorine, bromine, amino, lower alkylamino, di-(lower alkyl)-amino, lower hydroxyalkylamino, di-(lower hydroxyalkyl)-amino lower alkoxyalkylamino, lower carboxyalkylamino, N-lower alkyl-N-lower carboxyalkylamino, lower sulfoalkylamino, N-lower alkyl-N-lower sulfoalkylamino, phenylamino, N-lower alkyl-N-phenylamino, N-lower hydroxyalkyl-N-phenylamino, lower alkylphenylamino, chlorophenylamino, lower alkoxyphenylamino, carboxyphenylamino, sulfophenylamino, disulfophenylamino, sulfonaphthylamino, disulfonaphthylamino, cyclohexylamino, methylcyclohexylamino, benzylamino, phenoxy or lower alkoxy, and n being one of the integers 1 and 2.

Particularly interesting dyestuffs of the Formula I in which R—HN— corresponds to the Formula II, are those in which w represents hydrogen, chlorine or bromine, when n is 2, and those in which z represents amino, methylamino, 2'-hydroxyethylamino, 2'-sulfoethylamino, 3'- or 4'-sulfophenylamino, methoxy or chlorine, when n is 1.

The process for their production consists in coupling 1 mol of the diazo compound of an amine of the formula

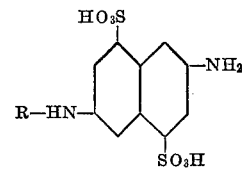

(III)

wherein R has the afore-cited meaning, with 1 mol of a hydroxynaphthalene or 1-aryl-5-pyrazolone bearing at least one sulfonic acid group and coupling in a position vicinal to the enolic or phenolic hydroxy group.

A second mode of operation of the process consists in coupling 1 mol of the diazo compound of an amine of the formula

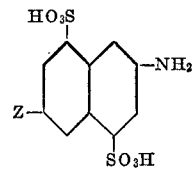

(IV)

wherein Z represents a substituent which is readily convertible into an amino group, with 1 mol of a hydroxynaphthalene or 1-aryl-5-pyrazolone bearing at least one sulfonic acid group and coupling in a position vicinal to the enolic or phenolic hydroxy group, converting the substituent Z in the product into an amino group and condensing the resulting intermediate product with 1 mol of a polyhalogeno-triazine of the formula

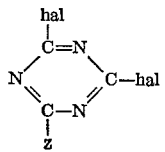
(V)

or a polyhalogeno-pyrimidine of the formula

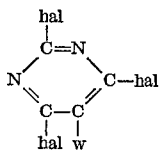
(VI)

wherein hal, z and w have the above-cited meanings.

The compounds of Formula V are e.g. cyanuric chloride, cyanuric bromide, primary condensation products of a cyanuric halide of the composition

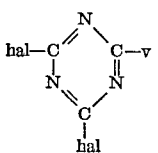

wherein:

hal represents chlorine or bromine, and v the radical, which may be further substituted, of a primary or secondary aliphatic, alicylic or aromatic amine, or a lower alkoxy or phenoxy radical, in particular the radical of aniline, its alkyl and sulfonic acid or carboxylic acid derivatives, low molecular monoalkyl- or dialkyl-amines optionally substituted by OH or $SO_3H$ groups or the radical of ammonia.

Among the compounds of Formula VI the following may be mentioned: 2.4.6 - trichloro- or 2.4.6 - tribromo-pyrimidine, 2.4.6-trichloro- or 2.4.6-tribromo-5-methyl-, 5-ethyl-, -5-carboxy- or -5-carboxy-methyl-pyrimidine, 2.4.6-trichloro-5-bromopyrimidine, 2.4.5.6-tetrachloro- or 2.4.5.6-tetrabromopyrimidine.

The introduction of a cyanuric radical is best carried out in an aqueous medium at about 0° C. and at weakly acid reaction, e.g. at a pH value of 3 to 5. Cyanuric halide is used as such in solid form or in solution in an organic solvent, e.g. acetone. In the case of the primary condensation products of a cyanuric halide it is best to choose a temperature of 30° to 60° C. and a pH value of 4 to 6, while for the di-, tri- and tetrahalogenopyrimidines temperatures between 40° and 100° C. and pH-values from 3 to 7 are most suitable.

The introduction of a monohalogeno-1.3.5-triazinyl radical can also be carried out indirectly by condensing first the aminomonoazo dyestuff with a cyanuric halide and then reacting the obtained 4.6-dihalogeno-1.3.5-triazinyl-2-aminomonoazo dyestuff with ammonia, a primary or secondary amine.

The diazotization of the amines of Formula III or IV is carried out by the direct or, preferably, the indirect method at temperatures of e.g. 0° to 5° C. The coupling reaction is conducted in a weakly acid, neutral or alkaline medium, preferably at pH 6 to 10, and at low temperatures, e.g. 5° to 10° C.

Examples of coupling components B-H which are suitable for the process are: e.g. 1-phenyl-3-methyl-5-pyrazolone-2′.5′-disulfonic acid, 1 - phenyl-3-methyl-5-pyrazolone-2′,4′-disulfonic acid, 1-(2′.5′ - dichloro) - phenyl-3-methyl-5-pyrazolone-4′-sulfonic acid, 1-phenyl-3-methyl-5-pyrazolone-4′-sulfonic acid, 1-phenyl-3-methyl-5-pyrazolone-3′-sulfonic acid, 1-(2′-chloro) - phenyl-3-methyl-5-pyrazolone-4′- or -5′-sulfonic acid, 1-phenyl-3-carboxy-5-pyrazolone - 3′- or 4′ - sulfonic acid, hydroxynaphthalene-sulfonic acids, such as 1-hydroxynaphthalene-4- or -5-sulfonic acid, 2-hydroxynaphthalene-4-, -5-, -6-, -7- or -8-sulfonic acid, 1-hydroxynaphthalene-3,6-, -3,8-, -4,7- or -4,8-disulfonic acid, 2 - hydrdoxynaphthalene-3,6- or -6,8-disulfonic acid, 1-hydroxy- and 2-hydroxynaphthalene-3.6.8-trisulfonic acid and their mixtures, N-substituted 2-amino- or 3-amino-5-hydroxynaphthalene-7-sulfonic acid or N-substituted 1-amino - 8 - hydroxynaphthalene-3,6- or -4,6-disulfonic acid e.g. 1-acetylamino-8-hydrdoxynaphthalene-3,6- or -4,6-disulfonic acid, 1-chloroacetylamino- or 1-β-chloropropionylamino-8-hydroxynaphthalene-3,6- or -4,6-disulfonic acid, 1-(4′,6′-dichloro - 1′,3′,5′ - triazinyl-2′)-amino-8-hydroxynaphthalene-3,6- or -4,6-disulfonic acid, 2-(4′-phenylamino-6′-chloro-1′.3′.5′-triazinyl-2′) - amino-5 - hydroxynaphthalene-7,4″-disulfonic acid, 2-chloroacetylamino-8-hydroxynaphthalene-6-sulfonic acid, etc.

The diazo components employed in the second mode of operation of the process, namely 2-amino-6-nitro- or -6-acylamino- (e.g. -6-acetylamino-, -6-benzoylamino-, -6-oxalylamino- or -6-carbethoxy-amino) - naphthalene-4.8-disulfonic acids, are diazotized in the same way, and the diazo compound coupled with a coupling component conforming to the invention in the same way as in the case of the monocondensation products of a 2,6-diamino-naphthalene-4,8-disulfonic acid and a reactive compound of the Formula V or VI.

Subsequently the nitro group is reduced, e.g. by treatment with an aqueous solution of sodium sulfide or sodium hydrogensulfide, preferably at 60° to 90° C., or the acylamino group is hydrolyzed, e.g. by dissolving the product in 10 to 20 times its amount of concentrated sulfuric acid and diluting with water to a sulfuric acid concentration of about 80% so that the temperature increases to about 100° C., or by heating in an aqueous solution of alkali-metal hydroxides, preferably in a 5% to 10% solution of sodium or potassium hydroxide at 70–100° C. The aminoazo compound thus obtained is condensed with a reactive compound of the Formula V or VI as described in the foregoing.

On completion of condensation or coupling the solution or suspension may be neutralized if desired and the final reactive dyestuff is then salted out with sodium or potassium chloride or precipitated with acid and subsequently filtered with suction, washed and dried.

The new reactive monoazo dyestuffs bear three to five sulfonic acid groups and possess therefore good solubility in water, good stability in printing pastes and padding liquors, good compatibility with salts and hard water, good reactivity with vegetable fibers, e.g. cotton and linen; regenerated cellulose, e.g. viscose filament fibers, viscose staple fibers, cuprammonium rayon; animal fibers, such as wool and silk; and synthetic polyamide fibers such as Nylon 66, Nylon 6 and Nylon 11; they are practically insensitive to heavy metal ions such as copper, iron and chromium ions and reserve cellulose-2½ and triacetate, polyester fibers such as polyethylene terephthalate, polyvinyl chloride and polyvinyl acetate fibers, polyacrylonitrile fibers and polyalkylene fibers such as polyethylene and polypropylene fibers.

The new dyestuffs are suitable for dyeing leather; for dyeing, padding and printing wool and silk, synthetic polyamide fibers, fibers of natural and regenerated cellulose and blends of these fibers. The commonly used padding and printing techniques can be applied, e.g. the padding processes pad jig, pad steam, pad roll, pad batch and thermofixation process, and the printing processes named roller printing, screen printing, emulsion printing and Vigoureux printing; in these printing processes the dyestuffs are fixed on the substrate by steaming or thermofixation.

The optimum conditions of application vary with the fiber to be dyed and the dyestuffs used. Animal fibers and synthetic polyamide fibers are best dyed or printed or fixed in acid, neutral or weakly alkaline medium, e.g. in presence of acetic acid, formic acid, sulfuric acid, ammonium sulfate, sodium metaphosphate etc. The dyestuffs can also be applied from an acetic acid to neutral bath in presence of levelling agents, e.g. polyoxyethylated fatty amines or mixtures of these and alkylpolyglycol ethers, in which case the bath is made neutral or weakly alkaline at the end of the dyeing process by the addition of small amounts of an agent of alkaline reaction, e.g. ammonia, sodium bicarbonate or carbonate etc. or compounds which react alkaline on heating, e.g. hexamethylene-tetramine or urea. Subsequently the goods are thoroughly rinsed and, if necessary, scoured with a little acetic acid.

The dyeing, padding and printing or fixation of the dyestuffs on cellulosic fibers are carried out advantageously in alkaline medium, e.g. in presence of sodium carbonate or bicarbonate, sodium hydroxide solution, potassium hydroxide solution, sodium metasilicate, sodium borate, trisodium phosphate, ammonia etc. To preclude reduction effects in deying, padding and printing, it is often advantageous to add a mild oxidizing agent, e.g. sodium 1-nitrobenzene-3-sulfonate. Dyeings and prints of the dyestuffs on cellulosic fibers are normally fixed by heat treatments. The dyestuffs can also be fixed at low temperatures, e.g. 20° to 40° C., e.g. with an alkali metal carbonate or bicarbonate (sodium or potassium carbonate or bicarbonate) in the case of the dyestuffs bearing a 4.6-dihalogeno-1.3.5-triazinyl-2 group, or with strong alkalis such as sodium or potassium hydroxide, sodium metasilicate or trisodium phosphate, in the case of the dyestuffs bearing a monohalogeno-1.3.5-triazinyl, a dihalogeno- or trihalogenopyrimidyl group.

In dyeing, padding and printing applications the dyestuffs can be fixed simultaneously or subsequently, in the same or in a fresh bath, if necessary after intermediate drying. When fixation is carried out in a fresh bath it is advisable to include in it a water-soluble salt, e.g. sodium sulfate, to preclude a partial redissolving of the dyestuff in the liquor. After fixation the portion of unreacted dyestuff, i.e. the dyestuff which has not taken part in the chemical reaction with the fiber, must be removed from the dyed or printed material. Owing to the very slight substantivity and the good solubility in water of the new dyestuffs this removal is in general easy and can often be carried out by rinsing with hot water, whereby in case of prints no staining of the unprinted areas appears. Washing at higher temperatures with solutions of soap or of synthetic detergents, e.g. alkylarylsulfonates such as sodium dodecylbenzenesulfonate, alkyl sulfates such as sodium dodecyl, oleyl or cetyl sulfate, optionally sulfated or carboxymethylated alkylpolyglycol, mono- or dialkylphenylpoly-glycol ethers, although it is seldom necessary, is nevertheless generally employed in routine padding and printing processes in order to obtain perfect prints and dyeings.

The dyeings and prints on cellulosic fibers possess excellent fastness to water, sea water, washing, acid and alkaline perspiration, crocking, ironing and organic solvents (alcohols, ketones, esters, aromatic and aliphatic hydrocarbons which may be halogenated, pyridine and 1:1-pyridine-water-mixture, dimethylformamide, dimethylsulfoxide, etc.), these excellent fastness properties being due to the stable chemical linkage formed between the dyestuff molecule and the cellulose molecule. In addition the dyeings and prints are also fast to acids (cold dilute acetic and tartaric acid), alkali (sodium bicarbonate and carbonate) and peroxides. They further possess good fastness to light, gas fumes and chlorinated swimming pool water and are suitable for anticrease finishing treatments.

The dyeings and prints on wool, silk and synthetic polyamide fibers possess a good fastness to light and excellent fastness properties to washing, water, sea water, milling, acid and alkaline perspiration, crocking, pressing and organic solvents; they are also stable against chlorinated swimming pool water, peroxides, acids (dilute acetic and tartaric acid in the cold), alkali (sodium carbonate and bicarbonate) and gas fumes.

In the following examples the parts and percentages are by weight and the temperatures in degrees centigrade.

Example 1

31.8 parts of 2.6-diaminonaphthalene-4.8-disulfonic acid are dissolved in 300 parts of water with the addition of 27 parts of 30% sodium hydroxide solution. 19 parts of 2.4.6-trichloropyrimidine dissolved in 20 parts of acetone are then added and the mass is maintained at a temperature of 40–50° for 4 hours with stirring and under reflux. The reaction product formed is precipitated in crystalline form. After cooling to 10–12°, 40 parts of 30% hydrochloric acid are added so that a mineral acid reaction ensues, and a solution of 7 parts of sodium nitrite in 30 parts of water is added dropwise for diazotization. The resulting suspension of the diazo compound is run into an ice-cold solution of 35 parts of 1-phenyl-3-methyl-5-pyrazolone-2'.4'-disulfonic acid and 50 parts of sodium carbonate in 400 parts of water in the course of about 30 minutes.

The monoazo dyestuff formed is precipitated with the aid of sodium chloride, filtered off and dried. A red powder is obtained, which dissolves in water with a yellow-red coloration and dyes cotton and fibers of regenerated cellulose in yellow-orange shades of excellent washing fastness.

A padding solution is prepared with 10 parts of the above dyestuff in 1000 parts of water and 10 parts of sodium carbonate. A cotton fabric is impregnated with this solution, passed between squeeze rollers so that it contains about 70% of its weight of liquor, and dried.

The padded goods are treated in dry heat for about 5 minutes at 150°, rinsed with cold and warm water, soaped at the boil for 15 minutes with a 0.05–0.1% solution of a non-ionic detergent and rinsed. A brilliant yellowish orange dyeing is obtained, which is fixed so stably as to be fast to boiling and to the other wet treatments and is stable to crease-resistant finishes. A similar dyestuff is obtained when the 19 parts of 2.4.6-trichloro-pyrimidine in the above example are replaced by 32 parts of 2.4.6-tribromopyrimidine.

Example 2

The aqueous suspension of the diazo compound of 36 parts of 2-amino-6-acetylaminonaphthalene-4.8-disulfonic acid, prepared in the normal way, is run in the course of 30 minutes into an ice-cold solution of 35 parts of 1-phenyl-3-methyl-5-pyrazolone-2'.5'-disulfonic acid and 50 parts of sodium carbonate in 400 parts of water. The monoazo dyestuff formed is precipitated with common salt and filtered off. The filter residue is dissolved in 250 parts of water at 75–80°, and 100 parts of 30% sodium hydroxide solution are added. The mass is maintained at 75–80° for about 30 minutes with stirring, whereupon the saponification of the acetylamino group is complete. On cooling, about 80 parts of 30% hydrochloric acid are dropped in to bring the pH value of the solution to 4–5. After the addition of about 22 parts of 2.4.5.6-tetrachloropyrimidine the mass is stirred for 4 hours at 60–65°. By dropping in diluted sodium carbonate solution a constant pH value of between 4 and 5 is maintained. On completion of the reaction the solution is treated with blood charcoal. After filtration, the dyestuff is precipitated from the solution by the addition of sodium chloride, filtered with suction, washed with sodium chloride solution and dried. The ground dyestuff is a red powder which dissolves in water with a yellow-red coloration.

A mercerized cotton fabric is printed with a printing paste of the following composition:

| | Parts |
|---|---|
| The above dyestuff | 30 |
| Urea | 100 |
| Water | 395 |
| Sodium alignate thickening (4%) | 450 |
| Sodium 1-nitrobenzene-3-sulfonate | 10 |
| Sodium carbonate | 15 |
| | 1000 |

The print is dried and fixed by steaming for 10 minutes. It is then rinsed in the normal way with cold and hot water, if necessary soaped at the boil, and rinsed again with hot water and cold water. On drying a brilliant yellow-orange print is obtained which has excellent fastness to wet treatments and is stable to crease-resistant finishes.

The corresponding dyestuffs obtained by condensation with 40 parts of 2.4.5.6-tetrabromopyrimidine or 26.5 parts of 5-bromo-2.4.6-trichloropyrimidine possess similar properties.

Example 3

An aqueous suspension of the diazo compound of 35 parts of 2-amino-6-nitronaphthalene-4.8-disulfonic acid is slowly run into a mixture, cooled to 10°, of 35 parts of 1-phenyl-3-methyl-pyrazolone-2'.5-disulfonic acid and 50 parts of sodium carbonate in 400 parts of water. On completion of coupling the mass is heated to 80°, a solution of 40 parts of crystallized sodium sulfide in 100 parts of water added, and the temperature maintained at 80° for 40 minutes. When the nitro group has been completely reduced the reaction mixture is allowed to cool, and then neutralized with concentrated hydrochloric acid to a pH value of 7. The aminoazo dyestuff is then salted out with sodium chloride. After some time the precipitate is filtered off and washed with concentrated sodium chloride solution. The filter residue is then dissolved in 900 parts of water. This solution is slowly run into a suspension of 18 parts of cyanuric chloride in 300 parts of ice and 200 parts of water at 0–5°, while a constant weakly acid reaction of the reaction mixture is maintained by the dropwise addition of diluted sodium carbonate solution. On completion of reaction the dyestuff is salted out with sodium chloride and filtered off. The filter residue is dried with vacuum at room temperature. An orange-colored powder is obtained, which dissolves in water with an orange-red coloration.

When the 18 parts of cyanuric chloride are replaced by 32 parts of cyanuric bromide, a similar dyestuff is obtained. A padding solution is prepared with 10 parts of the above dyestuff in 1000 parts of water and to it are added immediately before use 10 parts of sodium carbonate at room temperature. A cotton fabric is impregnated with this solution, passed between squeeze rollers so that it contains about 70% of its weight of liquor, rolled up on a roller, and wrapped in rubber or plastic sheets to prevent drying. After 3½ hours' storage at room temperature the goods are rinsed in cold and warm water, soaped at the boil for 15 minutes in a 0.05–0.1% solution of a non-ionic detergent and rinsed. An orange dyeing is obtained, which is fixed so stably as to be fast to boiling and to the other wet treatments and is stable to crease-resistant finishes.

Example 4

75.1 parts of sodium 1-phenyl-3-methyl-4-(6''-aminonaphthyl-2''-azo)-5-pyrazolone - 2'.5'.4''.8'' - tetrasulfonate—obtained according to the particulars of Example 3—are dissolved in 900 parts of water and the pH value is adjusted to 5. After the addition of 34.3 parts of sodium 2-phenylamino-4.6-dichloro-1.3.5-triazine - 3' - sulfonate the temperature is raised to 40° and maintained at 40–45° and the pH value between 4 and 6 by the addition of dilute sodium carbonate solution. On completion of reaction the dyestuff is salted out with sodium chloride and filtered off. The filter cake is dried with vacuum at 40°. An orange powder is obtained which dissolves in water with an orange-red coloration.

Example 5

The condensation product obtained from 71.5 parts of sodium 1-phenyl-3-methyl-4-(6''-aminonaphthyl-2''-azo-5-pyrazolone-2',5',4'',8''-tetrasulfonate and 18 parts of cyanuric chloride according to the particulars of Example 3 is dissolved in warm water and adjusted to about 1000 parts and a temperature of 40°. To the well stirred neutral solution 9.3 parts of aminobenzene are added dropwise and the temperature is maintained at 40–50° and the pH-value at about 5 by the addition of a 20% sodium carbonate solution. When no further alkali is consumed the formed dyestuff is precipitated by the addition of sodium chloride, filtered off with suction, dried and ground to give a yellow powder which dissolves in water with a yellow coloration and dyes cotton and wool in yellow shades fast to light and to wet treatments.

Similarly on condensing 79.5 parts of the dyestuff sodium 1 - phenyl - 3 - methyl - 4 - [6''-(4'''.6'''-dichloro-1'''.3'''.5''' - triazinyl - 2''' - amino)-naphthyl-2''-azo]-5-pyrazolone-3'.4''.8''-trisulfonate with 17.3 parts of 3-aminobenzene-1-sulfonic acid in aqueous medium at 35–45° and at a pH value between 4.5 and 5.0, a yellow dyestuff is obtained which dyes wool and cotton in reddish yellow shades fast to light and to wet treatments.

2 parts of the dyestuff of the first paragraph of this example, 0.8 part of an oxethylated fatty amine and 0.5 part of an oleylpolyglycol ether are dissolved in 5000 parts of water. After the addition of 2 parts of glacial acetic acid the dyebath is heated to 40–50° and 100 parts of prewetted wool are entered. The dyebath is then brought to the boil in 30 minutes and held at the boil for 45 minutes. Then the dyed wool material is removed, rinsed and dried. A level reddish yellow dyeing fast to wet treatments is obtained.

Example 6

41.7 parts of the monosodium salt of 2-amino-6-(4'.6'-dichloro - 1'.3'.5' - triazinyl - 2'-amino)-naphthalene-4,8-disulfonic acid—obtained by mono condensing 2,6-diaminonaphthalene-4,8-disulfonic acid with cyanuric chloride at 0–5° and at a pH-value of 4–4.5 and isolating from acid medium—are suspended in 400 parts of water and 40 parts of 30% hydrochloric acid. After cooling to 10° a solution of 7 parts of sodium nitrite is added dropwise. When the diazotization is completed the diazo suspension is neutralized to Congo at 5–10° with 20% sodium carbonate solution and then run slowly into an ice cold solution of 35 parts of sodium 2-hydroxy-naphthalene-3.6-disulfonate in 400 parts of water, a 20% sodium carbonate solution being added to neutralize the acid formed during the reaction. After the addition of the diazo suspension the coupling mass is made alkaline with sodium carbonate solution and maintained alkaline until the dyestuff formation at 8–12° is completed. The dyestuff is precipitated with sodium chloride, filtered off, dried in vacuum at 30° and ground. It is a red-brown powder which dissolves in water with a red coloration and dyes cotton in red shades fast to light and to wet treatments.

Example 7

When the monocondensation product used in Example 6 is replaced by 63.2 parts of the disodium salt of 2-amino - 6 - (4' - phenylamino - 6' - chloro-1'.3'.5'-triazinyl- 2'-amino)-naphthalene-4.8.4"-trisulfonic acid—obtained by monocondensing 2.6-diaminonaphthalene-4.8-disulfonic acid with 2-phenylamino-4.6-dichloro-1.3.5-triazine-4'-sulfonic acid at about 40° and at a pH-value of about 5 and isolating the condensation product from acid medium—and the diazo compound is coupled with sodium 1-hydroxynaphthalene-3.8-disulfonic acid, a dyestuff with excellent fastness properties is obtained.

Mercerized cotton fabric is printed with a printing paste of the composition:

| | Parts |
|---|---|
| The above described dyestuff | 30 |
| Urea | 100 |
| Potassium carbonate | 20 |
| Sodium hydroxide solution (30%) | 2 |
| Sodium 3-nitrobenzene-1-sulfonate | 10 |
| Sodium alginate thickening (2.5%) | 450 |
| Water | 388 |
| Total | 1000 |

The print is dried, steamed for 10 minutes at 102°, rinsed with cold and hot water, soaped for 15 minutes at the boil with a 0.1% soap solution in distilled water, rinsed again and dried. The obtained red print is fast to light and to wet treatments and the unprinted areas are perfectly white.

In the following table are listed a number of further dyestuffs which were produced according to the invention and have the formula

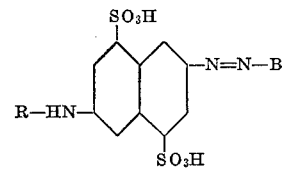

In the table they are characterized by the symbols R and B, the method of production according to Examples 1 to 7 and by the shade of the dyeing on cotton or wool in the columns I to IV.

| Example No. | R = Radical of (I) | B = Radical of (II) | Method of production according to example (III) | Shade of dyeing on cotton or wool (IV) |
|---|---|---|---|---|
| 8 | 2,4,5,6-tetrachloropyrimidine | 1-phenyl-3-methyl-5-pyrazolone-2',4'-disulfonic acid | 2 | Reddish yellow. |
| 9 | do | 1-phenyl-3-methyl-5-pyrazolone-3',5'-disulfonic acid | 2 | Do. |
| 10 | do | 1-phenyl-3-methyl-5-pyrazolone-4'-sulfonic acid | 2 | Do. |
| 11 | do | 1-(2',5'-dichloro)-phenyl-3-methyl-5-pyrazolone-4'-sulfonic acid | 2 | Do. |
| 12 | do | 1-hydroxynaphthalene-3.6-disulfonic acid | 1 | Red. |
| 13 | do | 1-hydroxynaphthalene-4,6-disulfonic acid | 2 | Red. |
| 14 | 5-bromo-2,4,6-trichloropyrimidine | 1-hydroxy-8-acetylaminonaphthalene-3,6-disulfonic acid | 2 | Bluish red. |
| 15 | 2,4,5,6-tetrachloropyrimidine | 1-hydroxy-8-chloroacetylaminonaphthalene-3,6-disulfonic acid | 2 | Do. |
| 16 | do | 2-hydroxynaphthalene-3.6-disulfonic acid | 2 | Red. |
| 17 | do | 2-hydroxynaphthalene-6,8-disulfonic acid | 2 | Red. |
| 18 | 2,4,6-trichloropyrimidine | 1-phenyl-3-methyl-5-pyrazolone-2',5'-disulfonic acid | 2 | Reddish yellow. |
| 19 | do | 1-phenyl-3-methyl-5-pyrazolone-3'-sulfonic acid | 1 | Do. |
| 20 | Cyanuric chloride | 1-phenyl-3-methyl-5-pyrazolone-4'-sulfonic acid | 3 | Do. |
| 21 | do | 1-phenyl-3-methyl-5-pyrazolone-3'-sulfonic acid | 3 | Do. |
| 22 | do | 1-hydroxynaphthalene-3.6-disulfonic acid | 3 | Red. |
| 23 | 2,4,6-trichloro-5-carboxypyrimidine | 1-phenyl-3-methyl-5-pyrazolone-2',4'-disulfonic acid | 2 | Reddish yellow. |
| 24 | 2,4,6-trichloro-5-methylpyrimidine | do | 2 | Do. |
| 25 | do | 2-hydroxynaphthalene-3,6-disulfonic acid | 2 | Red. |
| 26 | 2,4,5,6-tetra-chloropyrimidine | 1-(2'-chlorophenyl)-3-methyl-5-pyrazolone-5'-sulfonic acid | 2 | Reddish yellow. |
| 27 | 2,4,6-trichloro-5-ethylpyrimidine | 1-phenyl-3-methyl-5-pyrazolone-2',5'-disulfonic acid | 2 | Do. |
| 28 | 2,4,6-tribromo-5-methylpyrimidine | do | 2 | Do. |
| 29 | 2-phenylamino-4,6-dichloro-1,3,5-triazine-4'-sulfonic acid | 1-hydroxynaphthalene-4-sulfonic acid | 4 | Red. |
| 30 | 2-ethylamino-4,6-dichloro-1,3,5-triazine-2'-sulfonic acid | 2-acetylamino-5-hydroxynaphthalene-7-sulfonic acid | 5 | Red. |
| 31 | 2-carboxymethylamino-4,6-dichloro-1,3,5-triazine | do | 4 | Red. |
| 32 | 2-amino-4,6-dichloro-1,3,5-triazine | 2-propionylamino-8-hydroxynaphthalene-6-sulfonic acid | 5 | Red. |
| 33 | 2,4,6-tribromopyrimidine | 1-hydroxynaphthalene-3,6,8-trisulfonic acid | 2 | Red. |
| 34 | 2,4,6-trichloropyrimidine | 2-hydroxynaphthalene-3,6-disulfonic acid | 2 | Red. |
| 35 | 2,4,5,6-tetra-bromopyrimidine | 2-hydroxynaphthalene-3,6,8-trisulfonic acid | 2 | Red. |
| 36 | 2,4,6-trichloro-5-carboxymethylpyrimidine | 1-hydroxynaphthalene-4.8-disulfonic acid | 2 | Red. |
| 37 | 5-carboxy-2,4,6-tribromopyrimidine | 1-(2'-chlorophenyl)-3-methyl-5-pyrazolone 5-pyrazolone-4'-sulfonic acid | 2 | Reddish yellow. |
| 38 | 2-(2'-hydroxypropylamino)-4,6-dichloro-1,3,5-triazine | do | 5 | Do. |
| 39 | do | 1-hydroxy-napthalene-3.6-disulfonic acid | 5 | Red. |
| 40 | 2-amino-4,6-dibromo-1,3,5-triazine | do | 4 | Red. |
| 41 | 2-n-butylamino-4,6-dichloro-1,3,5-triazine | do | 5 | Red. |
| 42 | 2,4,5,6-tetrachloropyrimidine | do | 2 | Red. |

| | R = Radical of (I) | B = Radical of (II) | Method of production according to example (III) | Shade of dyeing on cotton or wool (IV) |
|---|---|---|---|---|
| 43 | 2-ethoxyethyl-amino-4.6-dichloro-1.3.5-triazine. | 2-hydroxynaphthalene-4-sulfonic acid | 5 | Red. |
| 44 | 2-(4'-methyl-phenylamino)-4.6-dichloro-1.3.5-triazine. | 2-hydroxynaphthalene-3.6.8-trisulfonic acid | 5 | Red. |
| 45 | 2-benzylamino-4.6-dichloro-1.3.5-triazine. | ...do | 5 | Red. |
| 46 | 2-amylamino-4.6-di-chloro-1.3.5-triazine (amyl mixture). | ...do | 5 | Red. |
| 47 | 2-(2'-carboxy-phenylamino)-4.6-dichloro-1.3.5-triazine. | 2-hydroxynaphthalene-6-sulfonic acid | 7 | Red. |
| 48 | 2.4.6-trichloro-pyrimidine. | ...do | 2 | Red. |
| 49 | 2-phenylamino-4.6-dichloro-1.3.5-triazine-2'.4'-disulfonic acid. | ...do | 7 | Red. |
| 50 | ...do | 1-(2'.5'-dichlorophenyl)-3-methyl-5-pyrazolone-4'-sulfonic acid. | 4 | Reddish yellow. |
| 51 | 2-naphthyl-2'-amino-4,6-dichloro-1.3.5-triazine-3'.6'-disulfonic acid. | ...do | 5 | Do. |
| 52 | 2-naphthyl-1'-amino-4,6-dichloro-1.3.5-triazine-4'-sulfonic acid. | 1-hydroxynaphthalene-4-sulfonic acid | 4 | Red. |
| 53 | 2.4.5.6-tetrachloro-pyrimidine. | 1-hydroxynaphthalene-4.7-disulfonic acid | 2 | Red. |
| 54 | 2-methylamino-4.6-dichloro-1.3.5-triazine. | ...do | 5 | Red. |
| 55 | 2-diethylamino-4.6-dichloro-1.3.5-triazine. | 1-phenyl-3-carboxy-5-pyrazolone-3'-sulfonic acid | 5 | Orange. |
| 56 | 2-di-(3'-hydroxy-propyl)-amino-4.6-dichloro-1.3.5-triazine. | ...do | 5 | Do. |
| 57 | 2-N-methyl-N-ethylamino-4.6-dichloro-1.3.5-triazine-2'-sulfonic acid. | 1-phenyl-3-methyl-5-pyrazolone-3'-sulfonic acid | 4 | Reddish yellow. |
| 58 | 2-naphthyl-1'-amino-4,6-dichloro-1.3.5-triazine-4'.8'-disulfonic acid. | ...do | 4 | Do. |
| 59 | 2-methoxy-4.6-dichloro-1.3.5-triazine. | ...do | 4 | Do. |
| 60 | ...do | 2-hydroxynaphthalene-3.6-disulfonic acid | 4 | Red. |
| 61 | 2-(4'-methylcyclo-hexylamino)-4.6-dichloro-1.3.5-triazine. | 1-hydroxynaphthalene-3.6.8-trisulfonic acid | 5 | Red. |
| 62 | 2-(3'-chlorophenyl-amino)-4.6-dichloro-1.3.5-triazine. | ...do | 7 | Red. |
| 63 | 2-N-ethyl-N-phenyl-amino-4.6-dichloro-1.3.5-triazine. | ...do | 5 | Red. |
| 64 | 2-N-methyl-N-phenylamino-4.6-dichloro-1.3.5-triazine. | 1-phenyl-3-methyl-5-pyrazolone-2'.5'-di-sulfonic acid | 5 | Reddish yellow. |
| 65 | 2-naphthyl-2'-amino-4.6-dichloro-1.3.5-triazine-5'-sulfonic acid. | ...do | 5 | Do. |
| 66 | 2-(4'-carboxphenyl-amino)-4, 6-dichloro-1.3.5-triazine. | ...do | 5 | Do. |
| 67 | 2-(2'-carboxyethyl-amino)-4.6-dichloro-1.3.5-triazine. | 1-hydroxy-8-benzoyl-aminonaphthalene-3.6-disulfonic acid | 4 | Bluish red. |
| 68 | 2-ethoxy-4.6-dichloro-1.3.5-triazine. | ...do | 4 | Do. |
| 69 | 2-amino-4.6-dichloro-1.3.5-triazine. | ...do | 5 | Do. |
| 70 | 2.4.5.6-tetrachloro-pyrimidine. | 1-hydroxy-8-acetyl-aminonaphthalene-5.7-disulfonic acid | 2 | Do. |
| 71 | ...do | 1-hydroxy-7-propinoyl-aminonaphthalene-3.6-disulfonic acid | 2 | Red. |
| 72 | 5-carboxymethyl 2.4.6-trichloropy-rimidine. | ...do | 2 | Red. |
| 73 | 2-(2'-hydroxyethyl-amino)-4.6-dichloro-1.3.5-triazine. | ...do | 5 | Red. |

| | R = Radical of (I) | B = Radical of (II) | Method of production according to example (III) | Shade of dyeing on cotton or wool (IV) |
|---|---|---|---|---|
| 74 | do | 1-(2'-methyl-6'-chloro-phenyl)-3-methyl-5-pyrazolone-4'-sulfonic acid. | 5 | Reddish yellow. |
| 75 | 2-phenylamino-4.6-dichloro-1.3.5-triazine-3'-sulfonic acid. | do | 4 | Do. |
| 76 | 2.4.6-trichlotopyrimidine. | do | 1 | Do. |
| 77 | do | 1-hydroxy-8-propionyl-aminonaphthalene-3.5-disulfonic acid. | 2 | Bluish red. |
| 78 | 2-cyclohexylamino-4.6-dichloro-1.3.5-triazine. | do | 5 | Do. |
| 79 | 2-(3'hydroxybutyl-amino)-4.6-dichloro-1.3.5-triazine. | 2-hydroxynaphthalene-7-sulfonic acid | 5 | Red. |
| 80 | 2-(3'-hydroxypropyl-amino)-4.6-dichloro-1.3.5-triazine. | 1-hydroxy-7-acetylamino-naphthalene-3-sulfonic acid. | 5 | Red. |
| 81 | 2-(3'methoxypropyl-amino)-4.6-dichloro-1.3.5-trizine. | do | 5 | Red. |
| 82 | 2.4.5.6.tetrachloropyrimidine. | do | 2 | Red. |
| 83 | do | 1-hydroxy-8-benzoylamino-naphthalene-3.5-disulfonic acid. | 2 | Bluish red. |
| 84 | 2-naphthyl-2'-amino-4.6-dichloro-1.3.5-triazine-5'.7'-di-sulfonic acid. | do | 4 | Do. |
| 85 | 2-methylamino-4.6-dibromo-1.3.5-triazine. | do | 5 | Do. |
| 86 | 2-phenoxy-4.6-dichloro-1.3.5-triazine. | 1-hydroxynaphthalene-4.6-disulfonic acid. | 4 | Red. |
| 87 | do | 1-phenyl-3-methyl-5-pyrazolone-2'.5'-di-sulfonic acid. | 4 | Reddish yellow. |
| 88 | 2-(2'hydroxyethyl-amino)-4.6-dibromo-1.3.5-triazine. | do | 5 | Do. |
| 89 | 2-ethylamino-4.6-dichloro-1.3.5-triazine. | do | 5 | Do. |
| 90 | 2-n-propylamino-4.6-dichloro-1.3.5-triazine. | 1-hydroxy-6-benzoyl-aminonaphthalene-3-sulfonic acid. | 5 | Red. |
| 91 | 2-di-(2'-hydroxyeth-yl)-amino-4.6-dichloro-1.3.5-triazine. | do | 4 | Red. |
| 92 | 2.4.5.6-tetrachloropyrimidine. | do | 2 | Red. |
| 93 | do | 1-hydroxy-7-acetylamino-naphthalene-3.6-disulfonic acid. | 2 | Red. |
| 94 | 2-N-2'-hydroxyethyl-N-phenyla-mino-4.6-dichloro-1.3.5-triazine. | do | 5 | Red. |
| 95 | 2-naphthyl-1'-amino-4.6-dichloro-1.3.5-triazine-3'.6'-disulfonic acid. | 1-hydroxy-6-butyryl-aminonaphthalene-3-sulfonic acid. | 7 | Red. |
| 96 | Cyanuric chloride | 1-hydroxy-8-butyrylamino-naphthalene-3.6-disulfonic acid. | 6 | Bluish red. |
| 97 | 2-dimethylamino-4,6-dichloro-1,3,5-triazine. | 1-hydroxy-8-acetylamino-naphthalene-3,5-disulfonic acid. | 5 | Do. |
| 98 | 2,4,5,6-tetrachloropyrimidine. | do | 2 | Do. |
| 99 | 2-di-(2'-hydroxypropyl)-amino-4,6-dichloro-1,3,5-triazine. | 2-hydroxynaphthalene-5-sulfonic acid. | 5 | Red. |
| 100 | 2-n-butoxy-4,6-dichloro-1,3,5-triazine. | 1-hydroxynaphthalene-4,6-disulfonic acid. | 4 | Red. |
| 101 | 2,4,6-trichloropyrimidine. | do | 1 | Red. |
| 102 | 2-phenylamino-4,6-dibromo-1,3,5-triazine-3'-sulfonic acid. | do | 4 | Red. |
| 103 | 5-carboxymethyl-2,4,6-tribromopyrimidine. | do | 2 | Red. |
| 104 | 2-(4'-methoxybutyl-amino)-4.6-dichloro-1.3.5-triazine. | do | 5 | Red. |
| 105 | 2-phenylamino-4.6-dichloro-1.3.5-triazine-2'.5'-disulfonic acid. | 1-hydroxynaphthalene-4-sulfonic acid. | 5 | Red. |
| 106 | do | 1-phenyl-3-methyl-5-pyrazolone-4'-sulfonic acid. | 4 | Reddish yellow. |
| 107 | 2-N-methyl-N-carboxymethylamino-4.6-dichloro-1.3.5-triazine. | do | 5 | Do. |
| 108 | 2-(4'-carboxyphenylamino)-4.6-dichloro-1.3.5-triazine. | do | 5 | Do. |
| 109 | do | 1-hydroxynaphthalene-5-sulfonic acid. | 5 | Red. |
| 110 | 2-(2'-methoxyphenylamino)-4.6-dichloro-1.3.5-triazine. | 2-hydroxynaphthalene-3.6-disulfonic acid. | 5 | Do. |

|  | R = Radical of (I) | B = Radical of (II) | Method of production according to example (III) | Shade of dyeing on cotton or wool (IV) |
|---|---|---|---|---|
| 111 | 2-n-propoxy-4.6-dichloro-1.3.5-triazine. | ......do...... | 4 | Red. |
| 112 | 2-naphthyl-1'-amino-4.6-dichloro-1.3.5-triazine-6'.7'-sulfonic acid. | 2-hydroxynaphthalene-8-sulfonic acid | 5 | Red. |
| 113 | 2-naphthyl-2'-amino-4.6-dichloro-1.3.5-triazine-6'-sulfonic acid. | 1-phenyl-3-carboxy-5-pyrazolone-4'-sulfonic acid | 5 | Orange. |
| 114 | 2.4.5.6-tetrachloropyrimidine. | ......do...... | 2 | Do. |
| 115 | 2-naphthyl-2'-amino-4.6-dichloro-1.3.5-triazine-4'.8'-disulfonic acid. | 1-hydroxynaphthalene-4-sulfonic acid | 4 | Red. |
| 116 | 2-naphthyl-2'-amino-4.6-dichloro-1.3.5-triazine-5'.7'-disulfonic acid. | ......do...... | 7 | Red. |
| 117 | 2-phenylamino-4.6-dichloro-1.3.5-triazine-2'.4'-disulfonic acid. | ......do...... | 5 | Red. |
| 118 | ......do...... | 1-hydroxy-7-benzoyl-aminonaphthalene-3-sulfonic acid | 4 | Red. |
| 119 | Cyanuric chloride. | 1-hydroxynaphthalene-4.7-disulfonic acid | 6 | Red. |

Formulae of representative dyes of the foregoing examples are as follows:

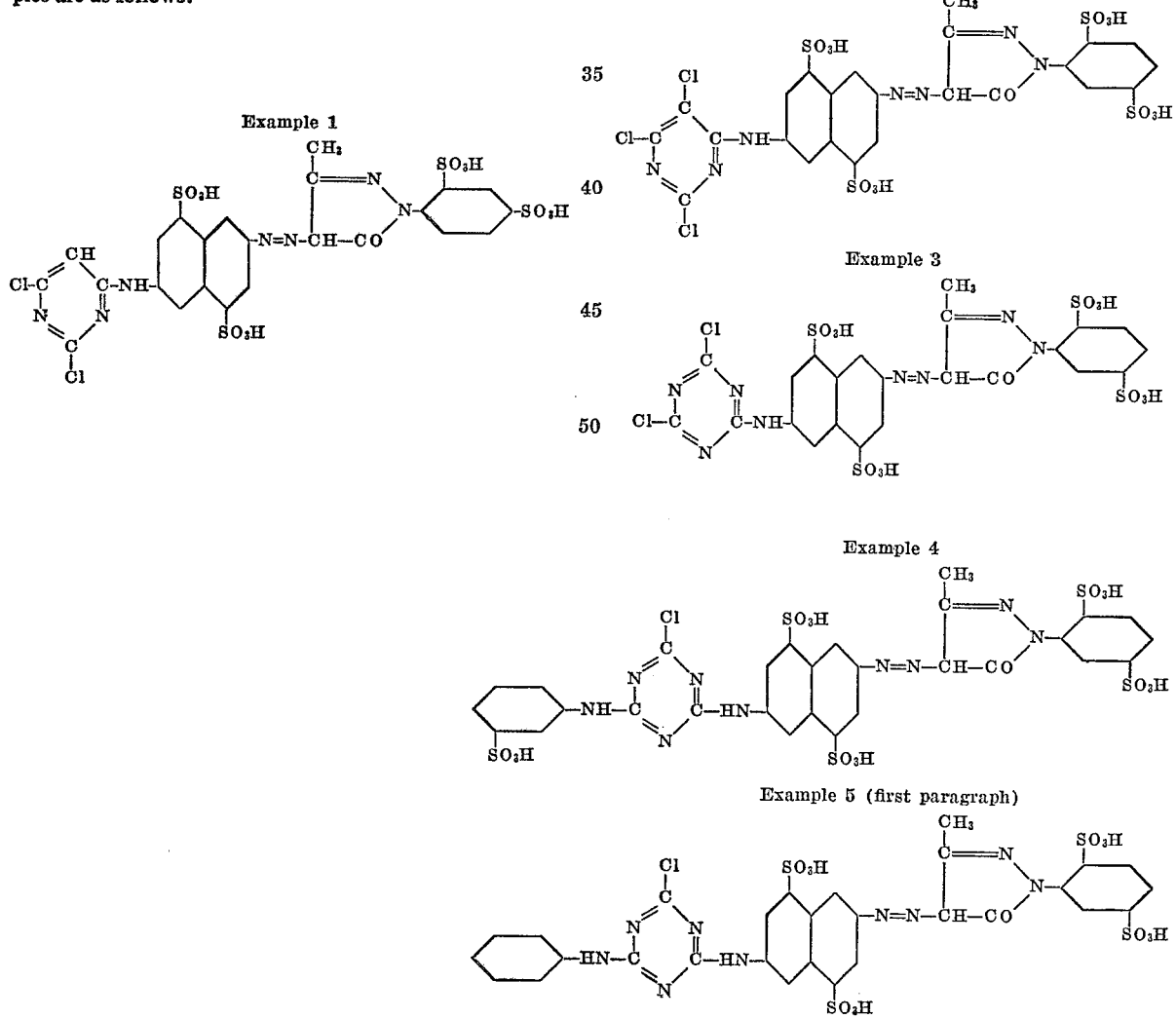

Example 1

Example 2

Example 3

Example 4

Example 5 (first paragraph)

Example 5 (second paragraph)

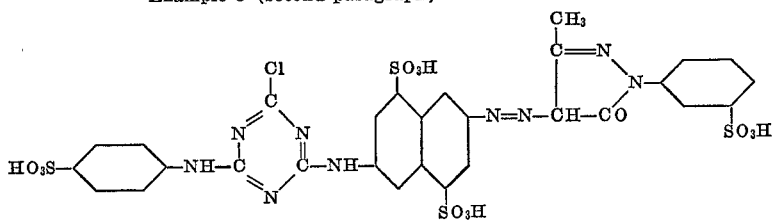

Example 9

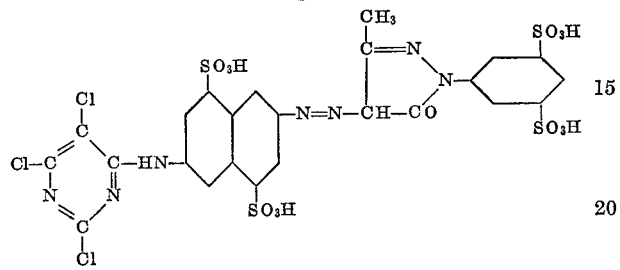

Example 18

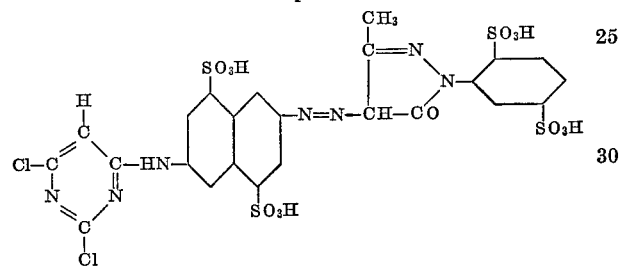

Example 26

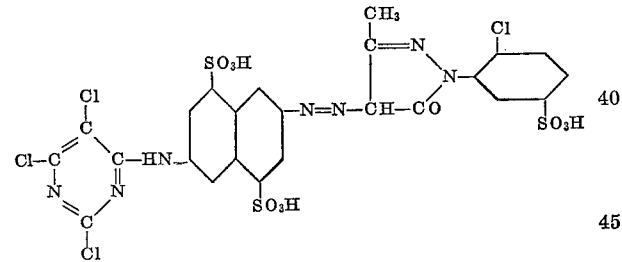

Having thus disclosed the invention, what I claim is:
1. A monoazo dyestuff of the formula

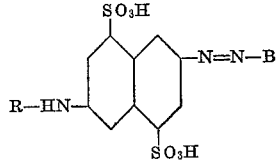

wherein
B is the radical of a position sulfonated 1-phenyl-5-pyrazolone coupled in a position vicinal to the enolic hydroxy group, and
R—HN is a group of the formula

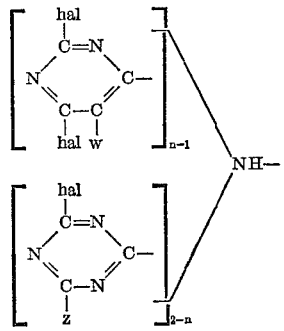

hal is a chlorine or bromine,
w is a member selected from the group consisting of hydrogen, chlorine, bromine, methyl, ethyl, carboxy and carboxy-methyl,
z is a member selected from the group consisting of chlorine, bromine, amino, lower alkylamino, di-(lower alkyl)-amino, lower hydroxyalkylamino, di-(lower hydroxyalkyl)-amino, lower alkoxyalkylamino, lower carboxyalkylamino, N-lower alkyl-N-lower carboxyalkylamino, lower sulfoalkylamino, N-lower alkyl-N-lower sulfoalkylamino, phenylamino, lower alkylphenylamino, lower alkoxyphenylamino, chlorophenylamino, carboxyphenylamino, sulfophenylamino, disulfophenylamino, sulphonaphthylamino, disulfonaphthylamino, cyclohexylamino, methylcyclohexylamino, benzylamino, phenoxy and lower alkoxy, and
n is an integer from 1 to 2, inclusive.
2. A monoazo dyestuff according to claim 1 of the formula

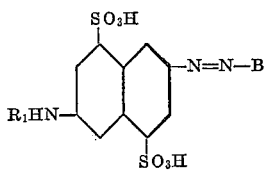

wherein
B is the radical of a sulfonated 1-phenyl-5-pyrazolone coupled in a position vicinal to the enolic hydroxy group, and
$R_1$ is a member selected from the group consisting of 2,6 - dichloro - pyrimidyl-4-, 2,5,6-trichloropyrimidyl-4-, 2,6 - dichloro - 5 - bromopyrimidyl-4-, 4-amino-6-chloro-1,3,5-triazinyl - 2-, 4 - methylamino-6-chloro-1,3,5 - triazinyl-2-, 4 - (2' - hydroxyethylamino-6-chloro - 1,3,5 - triazinyl-2-, 4-(2'-sulfoethylamino-6-chloro - 1,3,5 - triazinyl-2-, 4-(3'-sulfonphenylamino)-6-chloro-1,3,5-triazinyl-2-, 4-(4'-sulfonphenylamino)-6-chloro - 1,3,5 - triazinyl-2-, and 4,6-dichloro-1,3,5-triazinyl-2-.
3. The monoazo dyestuff according to claim 1 of the formula

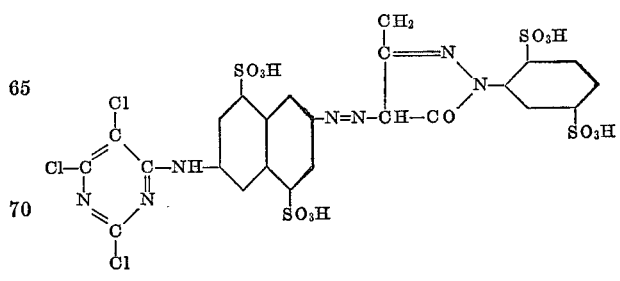

4. The monoazo dyestuff according to claim 1 of the formula

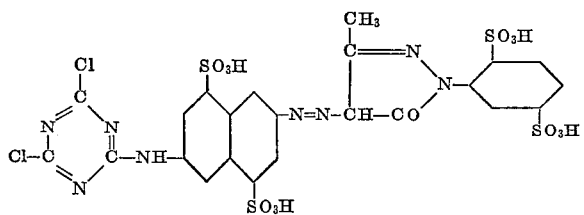

8. The monoazo dyestuff according to claim 1 of the formula

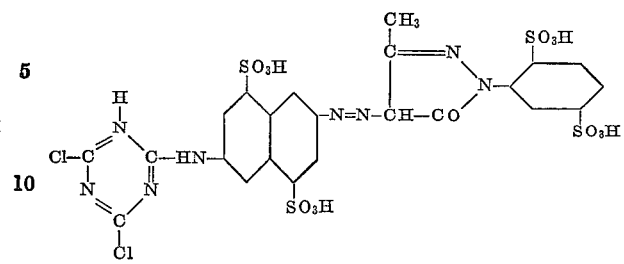

5. The monoazo dyestuff according to claim 1 of the formula

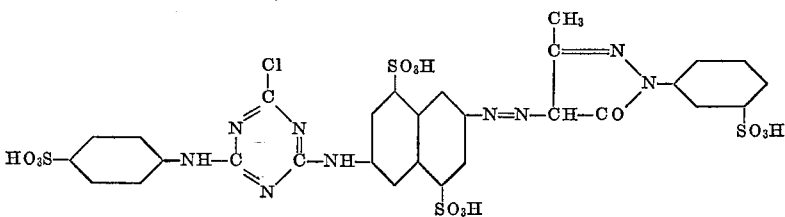

6. The monoazo dyestuff according to claim 1 of the formula

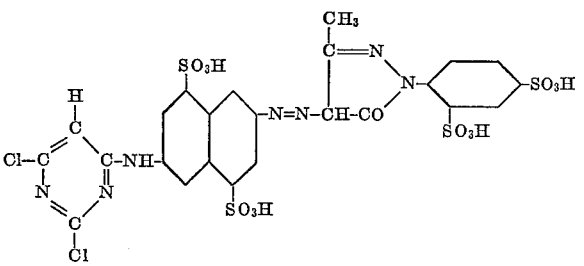

7. The monoazo dyestuff according to claim 1 of the formula

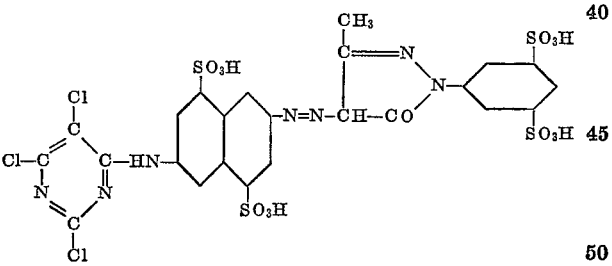

References Cited

UNITED STATES PATENTS

| | | | |
|---|---|---|---|
| 2,873,269 | 2/1959 | Fasciati et al. | 260—153 |
| 2,951,070 | 8/1960 | Stephen et al. | 260—153 |
| 2,951,071 | 8/1960 | Tilley | 260—153 |
| 2,951,072 | 8/1960 | Tilley et al. | 260—153 |
| 2,951,837 | 9/1960 | Andrew et al. | 260—153 |
| 3,097,197 | 7/1963 | Tilley et al. | 260—153 |
| 3,169,952 | 2/1965 | Riat et al. | 260—153 XR |
| 3,256,268 | 6/1966 | Dussy | 260—153 XR |
| 3,123,594 | 3/1964 | Koller et al. | 260—153 XR |

FLOYD D. HIGEL, Primary Examiner

U.S. Cl. X.R.

8—4, 13, 41, 50, 51, 63, 71; 117—138.8, 142; 260—37, 154, 162, 249.5, 251, 310, 510